United States Patent
Green et al.

(10) Patent No.: US 7,646,339 B2
(45) Date of Patent: Jan. 12, 2010

(54) GEODESIC POSITION DETERMINING SYSTEM

(75) Inventors: Alastair Green, Rebstein (CH); Jürgen Ruckdeschel, Marbach (CH); Josef Streule, Marbach (CH); Ralph Braun, St. Gallen (CH); Stefan Sieber, Widnau (CH)

(73) Assignee: Leica Geosystems AG, Heerbrugg (CH)

( * ) Notice: Subject to any disclaimer, the term of this patent is extended or adjusted under 35 U.S.C. 154(b) by 238 days.

(21) Appl. No.: 11/576,971

(22) PCT Filed: Oct. 11, 2005

(86) PCT No.: PCT/EP2005/055151

§ 371 (c)(1),
(2), (4) Date: May 24, 2007

(87) PCT Pub. No.: WO2006/040315

PCT Pub. Date: Apr. 20, 2006

(65) Prior Publication Data

US 2008/0036646 A1 Feb. 14, 2008

(30) Foreign Application Priority Data

Oct. 11, 2004 (EP) .................................. 04024205

(51) Int. Cl.
*G01S 5/02* (2006.01)
*H04B 7/185* (2006.01)
(52) U.S. Cl. .............................. 342/357.17; 342/357.14
(58) Field of Classification Search ............ 342/357.17, 342/357.14
See application file for complete search history.

(56) References Cited

U.S. PATENT DOCUMENTS

| 4,754,553 | A | * | 7/1988 | Simpson .................. 33/366.12 |
| 5,512,905 | A | | 4/1996 | Nichols et al. |
| 5,929,807 | A | | 7/1999 | Viney et al. |
| 6,067,046 | A | | 5/2000 | Nichols et al. |
| 6,633,256 | B2 | * | 10/2003 | Zhdanov et al. ........ 342/357.17 |
| 6,934,629 | B1 | * | 8/2005 | Chisholm et al. ........... 701/213 |
| 2001/0019101 | A1 | * | 9/2001 | Ohtomo et al. .......... 250/206.1 |
| 2003/0058164 | A1 | | 3/2003 | Zhdanov et al. |

FOREIGN PATENT DOCUMENTS

JP         2002022443       1/2002

OTHER PUBLICATIONS

ADXL202E data sheet, Analog Devices, copyright 2000.*

* cited by examiner

*Primary Examiner*—Thomas H Tarcza
*Assistant Examiner*—Cassi Galt
(74) *Attorney, Agent, or Firm*—Workman Nydegger

(57) ABSTRACT

A geodesic positioning system determines the position of a target point. The system includes a range pole that can be oriented toward the target point. A tilt sensor is arranged on the range pole, detachably where applicable, for generating a tilt angle signal related to the tilt angle of the range pole. A positioning element, more particularly a reflector or a satellite signal antenna, is arranged on the range pole. Positioning means is able to capture the position of the positioning element as a function of the tilt angle signal. Triggering means is in signal communication with the tilt sensor and with the positioning means, and adapted so that a trigger signal issued to capture the current position of the positioning element is transmitted to the positioning means as soon as the tilt angle signal corresponds to a tilt angle situated within a given tilt angle range.

18 Claims, 3 Drawing Sheets

GEODESIC POSITION DETERMINING SYSTEM

BACKGROUND OF THE INVENTION

The invention relates to a geodesic positioning system for determining the position of a target point with the aid of a range pole that can be oriented toward the target point.

Such a positioning system is for instance known from U.S. Pat. No. 5,512,905 A. A range pole system is described that involves a range pole that can be positioned on a target point situated more particularly on the ground, and is fitted at its upper end with a positioning element that may have the form of a reflector or satellite signal antenna. In addition, a biaxial tilt sensor that detects the tilt angle of the range pole, and a directional sensor, more particularly a compass, that detects the azimuthal orientation of the biaxial tilt sensor are attached to the range pole. The position of the target point is determined vectorially from a knowledge of the positioning element's position as determined by means of a tachymeter or of satellite signals, from the range pole's tilt angle, from the azimuthal orientation of the biaxial tilt sensor, and from the range pole's length. The vertical alignment of the range pole that is required in conventional systems may thus be omitted. However, the requirement of knowing the azimuthal orientation of the range pole is a disadvantage of the system described. This orientation cannot be determined with a single satellite signal antenna, so that a directional sensor must be employed, primarily a costly magnetic compass system or a demanding satellite positioning system involving several antennas. However, such systems have limited applicability in geodesy, inasmuch as they are complex, interference-prone, and not accurate enough for geodesic purposes, and will not function in places with interfering magnetic fields, more particularly in the vicinity of ferromagnetic objects, nor in shaded areas. A positioning accuracy of better than one to two centimeters cannot be attained with the system described.

In the U.S. Pat. No. 6,067,046 A, a geodesic positioning system involving a range pole is described that carries a GPS antenna and a spherical or tubular level. By reading the level, a user orients the range pole so that it will vertically point to a target point on the ground. The user triggers acquisition of the current GPS value by pushing a button as soon as he estimates that the orientation of the range pole is sufficiently vertical. However, this classical procedure has essential drawbacks. A decision as to whether the range pole is vertically aligned is made by the user, and thus is purely subjective, and may produce differing results. In addition, a sole value is acquired, that may correspond to the position just determined by the GPS antenna or to a mean of positions determined within a period of time prior to triggering the acquisition, and possibly with alignments of the range pole out of the vertical. In both cases a faulty determination cannot be excluded.

In the U.S. Pat. No. 5,929,807 A, a procedure and a device for positioning with the aid of a GPS range pole are proposed where neither a tilt sensor nor a directional sensor is needed. The GPS range pole is placed on a target point with one end, and then swayed by the surveyor around this target point while maintaining the contact between said end of the range pole and the target point. While the range pole is swayed, a multitude of positional points are acquired by means of the GPS antenna mounted onto the other end of the range pole. As said other end of the range pole is moved about a virtual spherical surface while being swayed, the acquired positional points will also be situated on a virtual spherical surface having the target point as its center, so that from the multitude of acquired positional points one may deduce the target point about which the range pole is swayed, by using calculus, for instance a mathematical least-squares analysis. However, if one wants to position the target point highly accurately for geodesic purposes, it will be necessary to determine the positional points highly accurately in all three coordinates, while satellite positioning systems offer limited possibilities for doing so, inasmuch as in said systems inherently the vertical positioning accuracy is substantially lower than the horizontal one. A sway of the range pole involving a tilt angle of about 20 degrees produces a vertical positioning accuracy of merely about three to four centimeters. For a determination of the sphere's center, and thus the target point, with an accuracy of better than one centimeter, the sway ought to occur with a sway angle of 90° when using a range pole having the usual length of about two meters, so that a hemisphere would be described. This is hardly realistic, already for ergonomic reasons, so that a positioning accuracy of better than one centimeter is not possible with the procedure described.

A solution to this problem is proposed in US 2003/0,058,164 A1, where in addition a tilt sensor is attached to the range pole, and the positional points acquired while swaying are each associated with the corresponding tilt angle of the range pole. The additional quantity gained in this way allows a higher positioning accuracy to be attained.

In JP 2002/022,443, a procedure is described that essentially corresponds to that of U.S. Pat. No. 5,929,807 A. However, instead of a GPS antenna, a reflector pointable by a tachymeter is used as the positioning element.

The procedures and devices described in U.S. Pat. No. 5,929,807 A, US 2003/0,058,164 A1, and JP 2002/022,443 have the common drawback that a great many individual measurements must be performed, and that the computational determination of the target point that is based on said multitude of data must be done by a costly calculation. On the one hand, this is time-consuming and ergonomically unfavorable, inasmuch as the range pole must be swayed about by the surveyor during a certain period of time. On the other hand, the evaluation requires high computing capacities. For real-time measurements, the procedures described require a manipulation of the unit used to evaluate the positional data, for instance of the GPS or tachymeter evaluating unit, or a demanding data postprocessing, since the position of the target point cannot be determined without demanding mathematical operations from the positional data acquired for the positioning element, and more particularly the GPS antenna or the reflector. Problems arise above all in modular systems where different modules are employed for a variety of measurements in a variety of configurations.

It is the aim of the invention to provide a highly precise modular geodesic range-pole positioning system for determining the position of a target point that has a favorable ergonomic operation, simple structure, and economic implementation, and that may as well be operated when an interference-free terrestrial magnetic field is not available, while essentially avoiding spurious results; and to improve the range-pole positioning systems known from the prior art.

This aim is achieved by realizing the characterizing features of the independent claim. Features developing the invention in an alternative or advantageous way can be seen from the dependent claims.

BRIEF SUMMARY OF THE INVENTION

The inventive geodesic positioning system for determining the position of a target point comprises a range pole that can be oriented toward a target point, is preferably straight and elongated, though as an alternative, possibly slightly curved or angled, and could be any kind of range pole, field rod, or rover rod of constant or variable length coming in a single piece or in several pieces. As a rule, such range poles have a length of about two meters. The orientation toward the target point usually is a manual operation where the range pole with its lower, more particularly pointed end is placed onto the target point that mostly is situated on the ground, and is followed by a vertical alignment of the range pole accomplished by swaying it about the target point. It is possible, however, to orient the range pole toward the target point even out of a direct contact with said target point, for instance by using a field rod tripod where the range pole is kept suspended while being oriented toward the target point.

A positioning element, more particularly a reflector or a satellite signal antenna, is attached to the range pole, more particularly to the end of the range pole that is situated opposite to the end pointing toward the target point. The positioning element serves as a reference element for measuring positions with positioning means. In one possible embodiment the positioning element is formed by an optically pointable target marking, particularly by a sighting disc or a reflector, for instance a three or five-sided prism or a double prism for angles of 90 degrees. A tachymeter placed at a distance is used here as the positioning means that can point to the target marking with a laser beam so that the position of the target marking may at least be determined relative to the tachymeter. Preferably, the tachymeter is an automatically tracking instrument so as to continuously point to the target marking in a standby mode. Instead of a tachymeter, other optical surveying instruments such as a conventional theodolite, a video theodolite, a total station or a level may be used as the positioning means, hence according to the invention, all positioning means able to determine the position of a target by optical acquisition of a target marking are regarded as tachymeters. In a second possible embodiment the positioning element is formed as a satellite signal antenna receiving satellite signals, more particularly GPS, GLONASS, or Galileo satellite signals. In this case the positioning means are a unit for evaluating satellite signals that is associated with the range pole, linked by wirebound or wireless signal communication with the satellite signal antenna, and able to acquire the position of the satellite signal antenna by evaluating the satellite signals received. The satellite signal evaluating unit is directly mounted to the range pole, for instance, or is attached to the body of the surveyor, e.g., by a carrying strap or in his backpack.

A tilt sensor acquiring the tilt angle of the range pole relative to the vertical axis is arranged on said range pole. Tilt sensors are known from the prior art in different makes. One may for instance use a pendulum system where the position of a damped pendulum is acquired optically with photodiodes or an encoding raster scan, or capacitatively with e.g., a differential capacitor, or a liquid system where the position of a bubble in a spherical or tubular level or the position of the surface of a reflecting liquid is sensed by optical, capacitative, or resistive means. Directly or indirectly, the tilt sensor produces a tilt angle signal having a close temporal link with the tilt angle of the range pole, the signal being more particularly in the form of a variable voltage, variable resistance, or variable capacitance. Even an optical signal carried by a glass fiber is feasible. Depending on the tilt sensor that is used, only the tilt angle relative to the vertical axis without its orientation, or both the tilt angle and the direction of tilt about the vertical axis may be captured.

According to the invention, the tilt sensor is in wirebound or wireless signal communication with triggering means which, in turn, are in wirebound or wireless signal communication with the positioning means. The triggering means are arranged so that a trigger signal for acquisition of the current position of the positioning element is transmitted to the positioning means as soon as the tilt angle signal corresponds to a tilt angle situated within a given tilt angle range. Preferably, the tilt angle situated in the middle of the given tilt angle range corresponds to an orientation of the range pole where the position of the positioning element is essentially vertically above the target point. In a positioning element that is concentrically arranged, this occurs when the range pole is vertically aligned. However, one also may realize an arrangement of the positioning element away from the axis of the range pole so that a certain oblique alignment of the range pole in a certain direction will correspond to a vertical orientation of the positioning element relative to the target point. In this case one may either mount the tilt sensor in the appropriate orientation onto the range pole, or use a tilt sensor that in addition can measure the orientation of the tilt angle.

As soon as the trigger signal is released by the triggering means, either an instantaneous position of the positioning element is acquired at once, and more particularly displayed and/or stored, or several individual position measurements are stored sequentially while the trigger signal is applied, said measurements then being processed further in a subsequent step, more particularly after storage of a certain number of measurements and/or interruption of the trigger signal following loss of the vertical range pole orientation, for instance by forming a mean value and more particularly an arithmetic mean, issuing this mean value as the result of positioning and/or storing it. In a development of the invention, the tilt angle signal or data related to it are acquired in addition for each of the several individual position measurements. While obtaining the mean value, the tilt angle signal or information associated with each of the individual position measurements is taken into account by attributing greater weight to an individual position measurement close to the middle of the given tilt angle range, than to an individual position measurement acquired in the periphery of the tilt angle range. This can for instance be accomplished by arranging the triggering means in such a way that the trigger signal is associated with weighting information that is a function, particularly a reciprocal function, of the difference between the middle of the given tilt angle range and the tilt angle. Thus, while the trigger signal is applied, a multitude of current positions of the positioning element are acquired as individual position measurements, and weighting information associated in time with the corresponding individual position measurements is also acquired. The weighted mean value of the acquired multitude of current positions is formed in such a way that positions measured closer to the middle of the given tilt angle range carry a stronger weight than positions measured further away from the middle. This can for instance be realized with a trigger signal having values between 0 and 1, their value being 0 outside the tilt angle range—which thus is excluded from averaging—but within the tilt angle range, rising up to 1 toward the middle of the range, so that the trigger signal immediately represents the weighting of each individual position measurement.

The triggering means may be constituted by an electrical circuit or by an algorithm that can be processed by a processor unit and that for instance is stored in a storage medium. Thus, the triggering means should be understood as being an abstract functional element that is not necessarily present in the form of a separate physical unit buy may be an abstract function algorithm. Said means may also be part of the tilt sensor, of the positioning means, or of further components.

The invention relieves the surveyor of the tiresome manual triggering of the measuring process, since the acquisition of the position is triggered automatically, particularly when the range pole is in a vertical orientation. Thus, errors produced by changes in the orientation of the range pole that occur while triggering the measurement, e.g., by actuating a button affixed to the range pole are avoided.

The readiness for making measurements may be signaled by the surveyor by actuating a readiness key. In the step that follows, the surveyor orients the range pole, for instance with a conventional level or with the aid of a tilt display associated with the tilt sensor, so that it will more particularly be vertical. As soon as the tilt angle of the range pole is within the given angular range, the position or, where applicable, a multitude of positions for averaging are acquired automatically and close in time. It is possible to arrange the triggering means so that the trigger signal will only be issued, once the tilt angle has been within the given tilt angle range for a certain length of time, so that measuring errors will be avoided. In this way it is avoided that a trigger signal is issued during an overly fast sway of the range pole and rapid transit through the tilt angle range. For, this could produce spurious results because of the time delay between passing the angular range and acquiring the position, even if this delay is undesirable and will be kept as small as possible. For this reason, preferably a tilt sensor having the smallest possible inertia should be selected. In addition, the triggering means and the positioning means including all wirebound and wireless signal communications should yield an acquisition of the position soon after arrival within the tilt angle range. It is possible as well to acquire the swaying speed that results from the rate of change of the tilt angle, and to suppress trigger signals at swaying speeds exceeding a certain limit where the time delay between the true tilt angle range transit and the acquisition of position could lead to an undesirably large discrepancy, and in this way avoid measuring errors attributable to the unavoidable inertia of the system. The tilt angle range and said precautions designed to avoid spurious results should be selected as functions of the desired measuring accuracy, and may where applicable be adjusted by the surveyor. Thus, for instance, the given tilt angle range as a rule should be selected larger when satellites are used for the positioning, than when optical measurements are made with a tachymeter, the latter as a rule yielding substantially higher measuring accuracies. Large tilt angle ranges lead to lower measuring accuracy, inasmuch as an acquisition of the position is triggered when the range pole is not exactly vertically aligned. However, in this case results may be obtained within a shorter period of time, since the tilt angle range is found more rapidly by the surveyor. However, the weighted averaging described above takes care that even for a relatively large tilt angle range a highly accurate mean value of the position can be found by swaying the range pole.

Apart from the positioning system, the invention comprises the process of determining the position of a target point that has also been described in this context.

BRIEF DESCRIPTION OF THE DRAWINGS

The geodesic positioning system according to the invention will be described in the following in greater detail, merely by way of example, by means of specific embodiments represented schematically in the drawings, while further advantages of the invention will also be dwelt upon. In detail, shown are in.

DETAILED DESCRIPTION OF THE INVENTION

Figure 1:
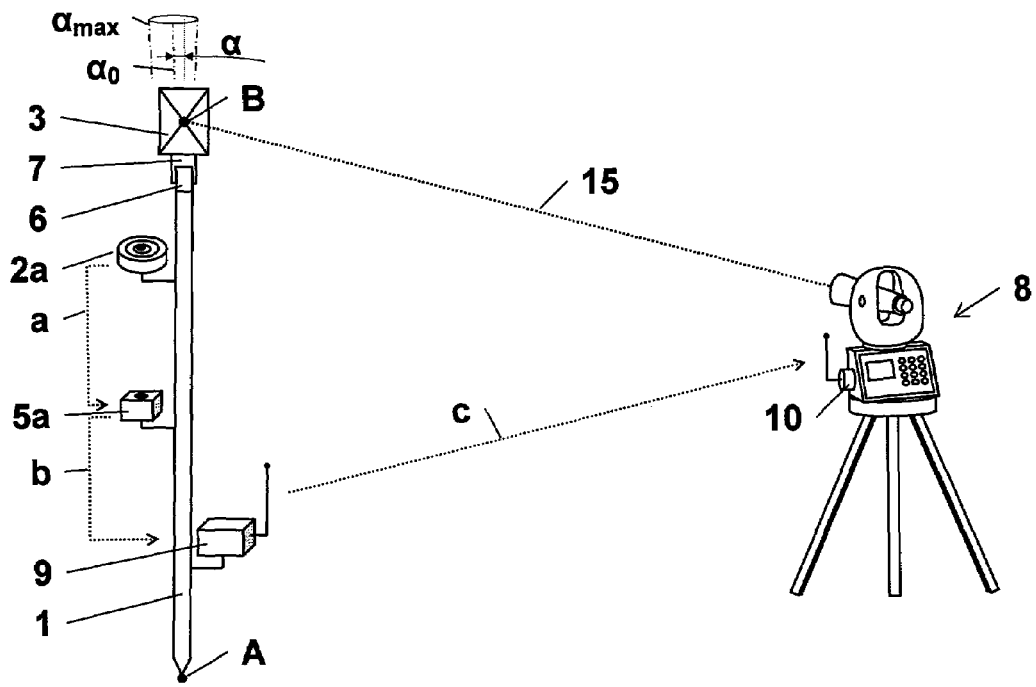
FIG. 1 a geodesic positioning system with a reflector pointable by a tachymeter and with triggering means arranged at the range pole.

In FIG. 1 a first possible embodiment of the geodesic positioning system according to the invention is represented. A range pole 1 points to a target point A with its lower end. A reflector 3 as the positioning element is located in a position B at the upper end of the range pole 1. The junction between range pole 1 and reflector 3 consists of matching, detachable forced-centering pieces 6 and 7 making it possible to remove reflector 3 from the range pole 1, and more particularly replace it with another positioning element. Reflector 3 is pointable with a laser beam 15 issuing from a tachymeter 8 placed at a distance from the range pole 1, so that the position of reflector 3 relative to that of tachymeter 8 can be captured. A tilt sensor 2a generating a tilt angle signal a related to the tilt angle $\alpha$ of the range pole 1 is mounted on said range pole 1. In this case the tilt angle $\alpha$ is measured relative to the vertical axis. In addition, triggering means 5a consisting of an electronic component in wirebound signal communication with the tilt sensor 2a and receiving the tilt angle signal a are arranged at the range pole 1. The triggering means 5a are adapted to generate a trigger signal b triggering capture of the current position B of reflector 3 as soon as the tilt angle signal a corresponds to a tilt angle $\alpha$ situated within a given tilt angle range $\alpha_{max}$. In a development of the invention, weighting information that is a function of the difference between the middle $\alpha_0$ of the given tilt angle range $\alpha_{max}$ and the tilt angle $\alpha$ is attached to the trigger signal b issuing from the triggering means 5a. The middle $\alpha_0$ of the given tilt angle range $\alpha_{max}$, in this case at once the reference axis for tilt angle $\alpha$, corresponds to an orientation of range pole 1 where position B of reflector 3 is vertically above target point A and at the same time said range pole 1 is vertically oriented owing to the concentric arrangement of reflector 3 on said range pole 1. Trigger signal b issuing from the triggering means 5a is fed via a wirebound signal link to a signal transmission device 9 arranged on range pole 1 and transmitting a transmission signal c combined with the trigger signal b. The transmission signal c is received by a signal receiving device 10 in wirebound signal communication with and arranged at tachymeter 8, hence a wireless signal communication exists between the signal transmission device 9 and the signal receiving device 10. When range pole 1 has attained an orientation such that the tilt angle $\alpha$ is within the tilt angle range $\alpha_{max}$ and the triggering means 5a issue the trigger signal b that is fed to tachymeter 8, the current position B of reflector 3 is immediately captured by said tachymeter 8 that is permanently pointed at said reflector 3 in an automatically tracking standby mode, and stored, where applicable together with weighting information. Given the automatic target tracking of tachymeter 8, just one surveyor is needed having the sole task during a surveying session, of positioning the range pole 1 on target point A and orienting it vertically. From the coordinates thus captured and stored, and from a knowledge of the distance between position B of reflector 3 and the target point A, the position of target point A is readily calculated. Where applicable, several positions of target point A are calculated, and a weighted mean value of the position is calculated via the associated weighting information.

Figure 2:
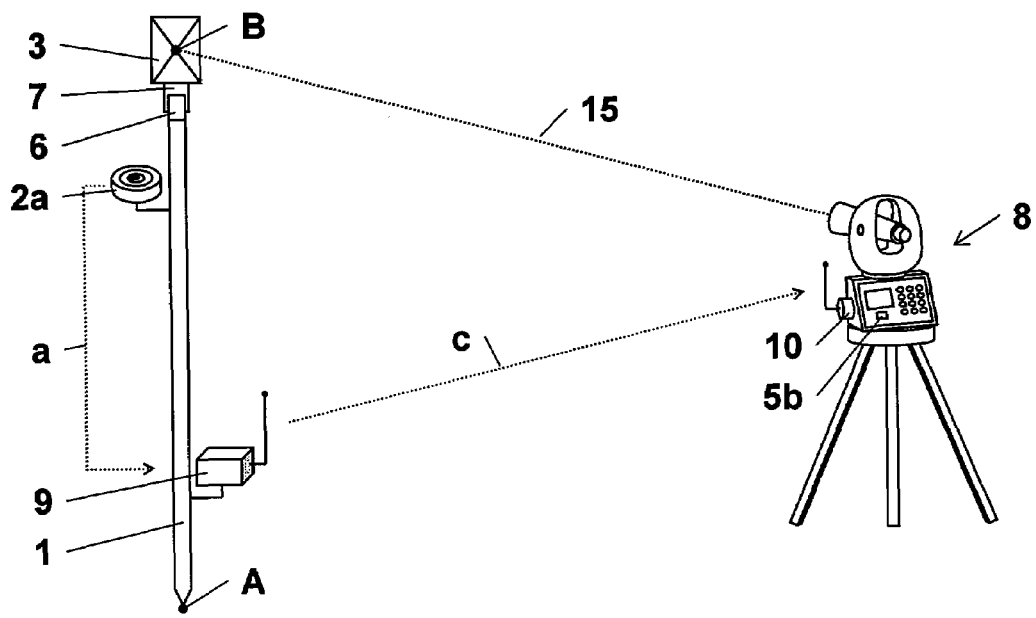
FIG. 2 a geodesic positioning system with a reflector pointable by a tachymeter and with triggering means integrated into the tachymeter.

FIG. 2 shows a second embodiment of the geodesic positioning system according to the invention. Here the triggering means are arranged, not at range pole 1 as in the first embodiment of FIG. 1 but at tachymeter 8. The tilt sensor 2a issuing the tilt angle signal a is in wirebound signal communication with the signal transmission device 9. In this way the transmission signal c transmitted by the signal transmission device 9 is combined with the tilt angle signal a. The signal receiving device 10 of tachymeter 8 thus receives the wireless transmission signal c containing the tilt angle signal a that is fed to tachymeter 8. In tachymeter 8, the triggering means 5b are integrated as a circuit or as an algorithm that is stored for instance in a storage component and can be processed by said tachymeter 8. Position B of reflector 3 is captured automatically in the vertical orientation via triggering means 5b, as described above.

Figure 3:
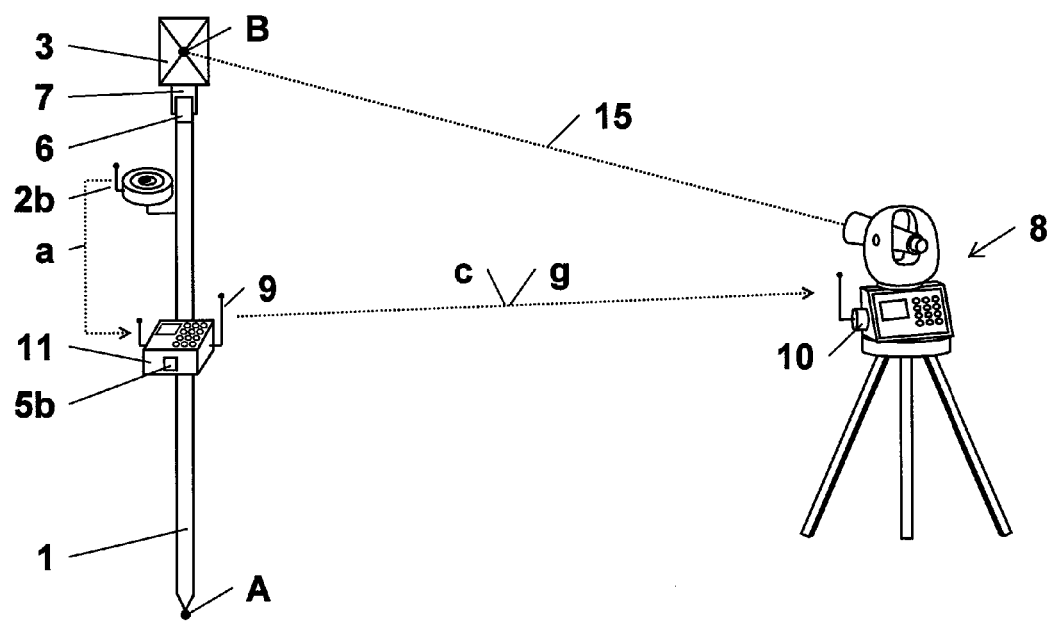
FIG. 3 a geodesic positioning system with a reflector pointable by a tachymeter and with triggering means integrated into a remote-control unit arranged at the range pole.

FIG. 3 shows a third embodiment of the geodesic positioning system that is also possible according to the invention. Here a tilt sensor 2b and a remote-control unit 11 are found on range pole 1. A wireless signal link corresponding to the Bluetooth standard, for instance, that feeds the tilt angle signal a to the remote-control unit 11 exists between tilt sensor 2b and said remote-control unit 11. The remote-control unit 11 has an integrated signal transmission device 9 providing its wireless signal communication with the signal receiving device 10 of tachymeter 8. The tachymeter 8 thus can be remote-controlled via remote-control signals g. The triggering means 5b are integrated into the remote-control unit 11 as a circuit or as an algorithm that more particularly is stored in a storage component and can be processed by the remote-control unit 11. The trigger signal b that is issued by the triggering means 5b is transmitted wirelessly via transmission signal c to tachymeter 8. This trigger signal b that is transmitted via the transmission signal c may of course be part of the remote-control signals g. This embodiment is particularly adapted for a one-man survey, inasmuch as a surveyor next to the range pole will be able via the remote-control unit 11 to remote-control all essential functions of tachymeter 8, which preferably is provided with an automatic target tracking, while the capture of position B of reflector 3 is automatically triggered by the remote-control unit 11 via the integrated triggering means 5b.

Figure 4:
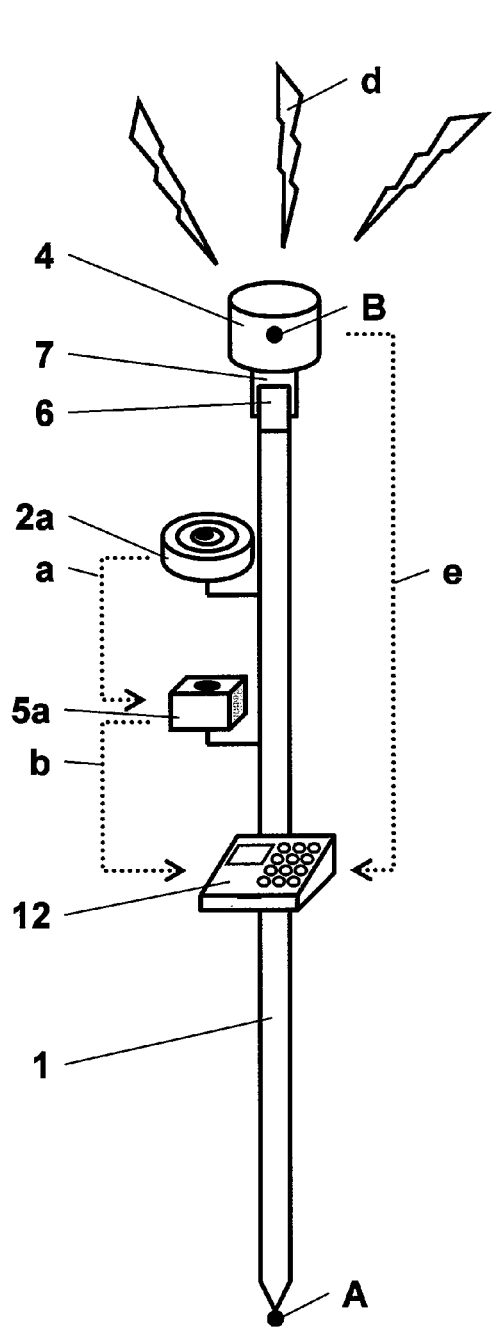
FIG. 4 a geodesic positioning system with a satellite signal antenna, a satellite signal evaluating unit arranged at the range pole, and triggering means arranged at the range pole.

FIG. 4 represents a fourth embodiment of the invention where a satellite signal antenna 4 detachably mounted on range pole 1 via matching forced-centering pieces 6 and 7 is used as the positioning element. Position B characterizes the antenna center of satellite signal antenna 4. Satellite signals d, and more particularly GPS, GLONASS, or Galileo satellite signals, are received via the satellite signal antenna 4. The satellite signals e received are fed via a wirebound signal communication to a satellite signal evaluating unit 12 that is mounted on range pole 1 and is able to capture the position B of the satellite signal antenna 4 in a manner known from the prior art, by evaluating the satellite signals e received. In addition, the tilt sensor 2a that generates the tilt angle signal a that is communicated to the triggering means 5a via a wirebound signal link is permanently mounted on range pole 1. The trigger signal b that is issued when range pole 1 is in a vertical orientation is fed to the satellite signal evaluating unit 12. Position B is captured in the form of measured position coordinates of the satellite signal antenna 4 as soon as trigger signal b is applied, and stored, where applicable together with the weighting information that had already been described above. So as to avoid spurious results, a multitude of current positions B of the satellite signal antenna 4 are captured while trigger signal b is applied, and a mean value of the captured multitude of current positions B is calculated, possibly weighted with the corresponding weighting information, either when a given number of recorded measurements have been completed, or when the trigger signal b is interrupted, or when the measurements are interrupted by the surveyor, or when a certain value of the weighting sum is attained.

Figure 5:
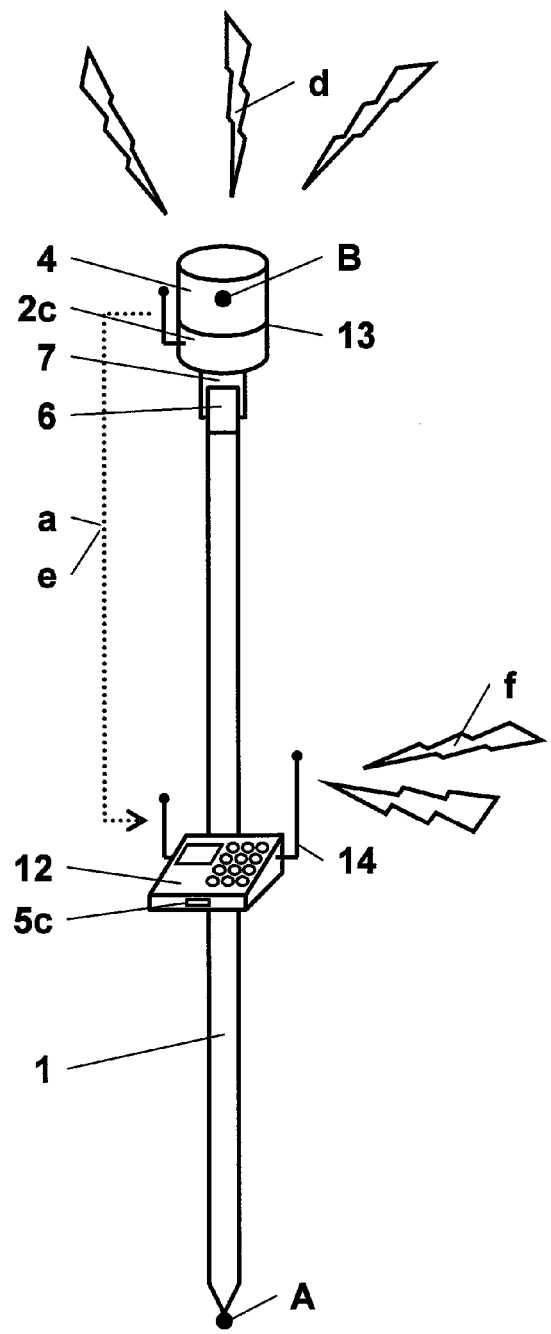
FIG. 5 a geodesic positioning system with a satellite signal antenna with integrated tilt sensor and a satellite signal evaluating unit with integrated triggering means and with a correction data receiving unit arranged at the range pole.

FIG. 5 shows an alternative to the fourth embodiment of FIG. 4, as a fifth embodiment of the invention. The satellite signal antenna 4 and a tilt sensor 2c housed in a common housing 13 are arranged at the upper end of range pole 1 with the aid of forced-centering pieces 6 and 7. This unit is in wireless signal communication, more particularly according to the Bluetooth standard, with the satellite signal evaluating unit 12 which in this way is supplied with the tilt angle signal a and the received satellite signals e. Triggering means 5c are integrated into the satellite signal evaluating unit 12 in the form of a circuit or of an algorithm that more particularly is stored in a storage component and can be processed by said satellite signal evaluating unit 12. In addition, the satellite signal evaluating unit 12 includes a correction data receiving unit 14 receiving correction signals f, more particularly RTK signals or DGPS signals, raising the accuracy of determination of position B of the satellite antenna 4 in ways known from the prior art. Position B is captured as described above, while on account of the vertical orientation of range pole 1 the position of the target point A can be calculated immediately, and preferably automatically, by the satellite signal evaluating unit 12 from a knowledge of the distance between position B of the satellite signal antennas 4 and the position of target point A.

What is claimed is:

1. Geodesic positioning system for determining the position of a target point, the system comprising:
 a range pole that can be oriented toward the target point;
 a tilt sensor arranged on the range pole for generating a tilt angle signal related to the tilt angle of the range pole;
 a positioning element;
 positioning means able to capture the position of the positioning element as a function of the tilt angle signal; and
 triggering means being in signal communication with the tilt sensor and with the positioning means, and adapted so that a trigger signal issued to capture the current position of the positioning element is transmitted to the positioning means as soon as the tilt angle signal corresponds to a tilt angle situated within a given tilt angle range, wherein:
  the triggering means are adapted so that the trigger signal is associated with weighting information that is a function of the difference between the middle of the given tilt angle range and the tilt angle; and
  the positioning means are adapted so that:
   while the trigger signal is applied, a multitude of current positions of the positioning element and the weighting information correlated in time with each of the positions are acquired; and
   a weighted mean value of the acquired multitude of current positions is formed in such a way that positions measured closer to the middle of the given tilt angle range obtain a larger weight in the mean value than positions measured further away from the middle.

2. The system of claim 1, wherein the tilt angle situated in the middle of the given tilt angle range corresponds to an orientation of the range pole where the position of the positioning element is essentially vertically above the target point.

3. The system of claim 1, wherein the range pole and the positioning element are provided with detachable, matched forced-centering pieces such that the positioning element may be removed from range pole and may more particularly be replaced by another positioning element.

4. The system of claim 1, wherein:
the positioning element is formed as a reflector; and
the positioning means are formed as a tachymeter that is placed at a distance from the range pole and is able to point to the reflector and to determine the position of the reflector.

5. The system of claim 4, wherein
a signal transmission device is associated with the range pole for transmitting via a wireless signal link at least a transmission signal combined with the tilt angle signal or the trigger signal, and
a signal receiving device associated with the tachymeter and in signal communication with it, for receiving the transmission signal.

6. The system of claim 5, wherein
the trigger means are arranged at the range pole and are in signal communication with the signal transmission device, and
the transmission signal is combined with the trigger signal.

7. The system of claim 5, wherein the triggering means are integrated as a circuit or as an algorithm that can be processed by a remote-control unit, into said remote-control unit that is associated with the range pole and is able to remote-control the tachymeter via the signal transmission device and the signal receiving device.

8. The system of claim 5, wherein
the tilt sensor is in signal communication with the signal transmission device,
the transmission signal is combined with the tilt angle signal, and
the triggering means are integrated into the tachymeter as a circuit or as an algorithm that can be processed by the tachymeter.

9. The system of claim 1, wherein
the positioning element is formed as a satellite signal antenna receiving satellite; and
the positioning means are formed as a satellite signal evaluating unit associated with the range pole which is in signal communication with the satellite signal antenna and is able to capture the position of the satellite signal antenna by evaluating the satellite signals received.

10. The system of claim 9, wherein the tilt sensor is in signal communication with the satellite signal evaluating unit, and the triggering means are integrated into the satellite signal evaluating unit as a circuit or as an algorithm that can be processed by the satellite signal evaluating unit.

11. The system of claim 9, wherein the tilt sensor is arranged in a common housing together with the satellite signal antenna.

12. The system of claim 9, wherein a correction data receiving unit is associated with the satellite signal evaluating unit and in signal communication with it so as to raise the accuracy of determination of position of the satellite signal antenna.

13. The system of claim 1, wherein the tilt sensor is detachably arranged on the range pole and the positioning element includes a reflector or a satellite signal antenna arranged on the range pole.

14. The system of claim 1, wherein the mean value includes an arithmetic mean value of the acquired multitude of current positions.

15. The system of claim 1, wherein:
the positioning element is formed as a reflector; and
the positioning means are formed as a tachymeter that is placed at a distance from the range pole, is provided with automatic target tracking, and is able to point to the reflector with a laser beam to determine the position of the reflector.

16. The system of claim 5, wherein the triggering means are integrated as a circuit or as an algorithm that can be processed by a remote-control unit, into said remote-control unit that is associated with the range pole and arranged on the range pole along with the signal transmission device, and is able to remote-control the tachymeter via the signal transmission device and the signal receiving device with the aid of remote-control signals.

17. The system of claim 1, wherein
the positioning element is formed as a satellite signal antenna receiving GPS, GLONASS, or Galileo satellite signals, and
the positioning means are formed as a satellite signal evaluating unit associated with the range pole, and arranged on the range pole, which is in signal communication with the satellite signal antenna and is able to capture the position of the satellite signal antenna by evaluating the satellite signals received.

18. The system of claim 9, wherein a correction data receiving unit is associated with the satellite signal evaluating unit and in signal communication with it and arranged on the range pole, for receiving RTK correction signals or DGPS correction signals, so as to raise the accuracy of determination of position of the satellite signal antenna.

* * * * *